March 14, 1950 — R B. WORDEN — 2,500,446

PACKAGE FOR FISH LINES

Filed March 7, 1947

Inventor
R. B. Worden
By Wilfred E. Lawson
Attorney

Patented Mar. 14, 1950

2,500,446

UNITED STATES PATENT OFFICE 2,500,446

PACKAGE FOR FISHLINES

R. B. Worden, Granger, Wash.

Application March 7, 1947, Serial No. 733,238

2 Claims. (Cl. 206—59)

The present invention relates to storing a continuous fishline, particularly one made of nylon, in one or more coiled rings or bundles of about ten yards each. Any number of such lengths being interconnected, so that for instance, 12 such rings would form a total length, before coiling of about 120 yards.

Now, in order to prevent entanglement, when a portion of the total length of the fish line is needed, the remaining coils become loose and much of it is wasted and thrown away. This happens frequently with the prevalent method of carrying a bundle of coils on an open cord.

The object of the present invention is now to provide a container in the shape of a closed envelope for each such coiled bundle, from which a desired length can be separated without disturbing the remaining portion.

This and other objects and advantages will be evident from the subjoined description with the aid of the attached drawing.

In the drawing, wherein like numerals denote the same details in the different views, Figure 1 is a front view of the container in the form of a square envelope open;

Figures 1, 2:
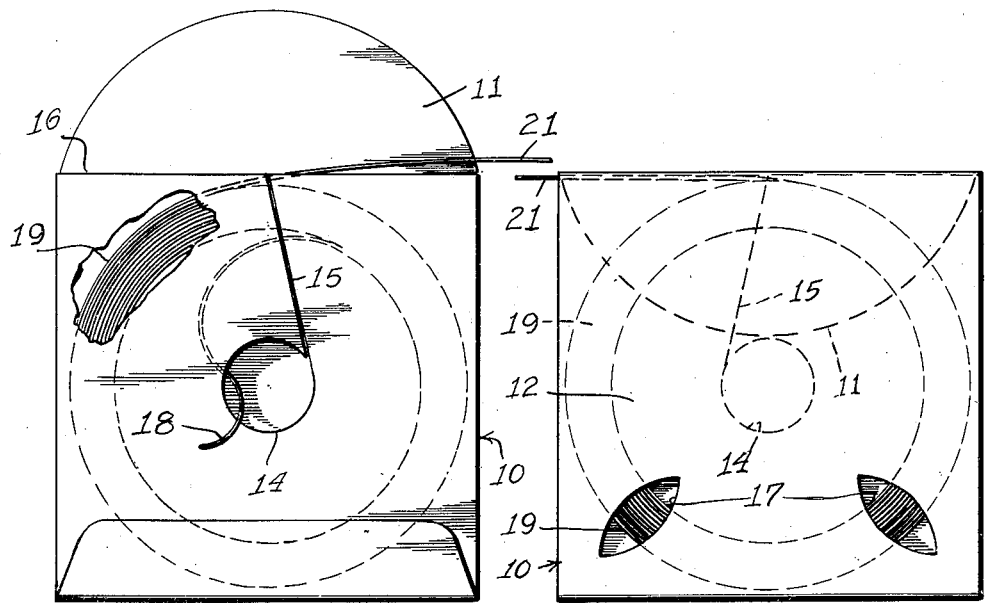
Figure 2 is a rear view of the same.

Numeral 10 denotes a square paper envelope with a flap 11, a plain smooth rear side 12, and a front side 13, with a small central hole 14, and a straight top opening 16 under the flap 11, the latter being gummed for closing when the envelope is filled.

From the central hole 14 and running tangentially thereto, is provided a slit 15 clear thru the front side 10, running out to the opening 16.

The rear side 12 may be provided with one or more oval peep holes or small windows 17 placed diagonally so that the coiled ring can be seen and the fisherman may determine how much used fish line he has left.

Figure 3:
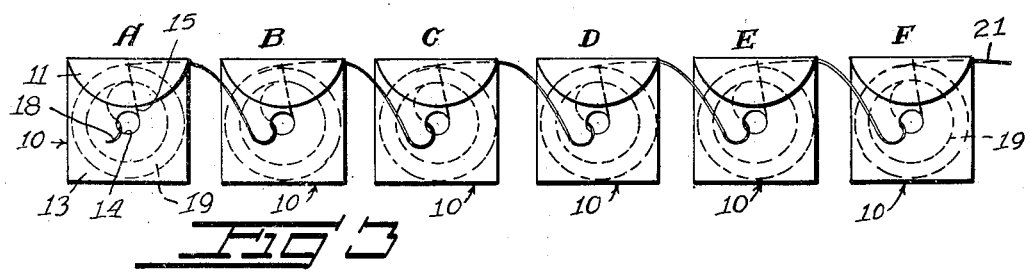
Figure 3 is a series of such envelopes for a continuous fish line stored in them as coiled rings of about 10 yards each shown diagrammatically.

In Figure 3, is indicated the manner of storing a continuous fish line, coiled into six bundles 19 of equal length deposited one in each envelope. One end 18 of the fish line enters thru the small hole 14 of envelope A, then forms as a coil 19 from the center to the periphery and continuous out from therethru the semi-radial slit 15 and out under the flap 11 to enter thru central hole 14 of envelope B and then out thru slit 15 thereof. This procedure is then repeated in envelopes C, D, E and F from which latter the opposite end of the fish line emerges as at 21 from the slit 15 thereof.

When the fisherman want to use his line, he then pulls from envelope A without lifting the flap, as much as he needs by pulling on end 18. If he needs more than the length of one coiled bundle of fish line, he continues to pull out more from envelopes B and C and so forth, and then throws away the empty envelope.

Ordinarily, when the coiled line is mounted openly on a cord, it is necessary to tie each coil twice; he must then untie the coils before he cuts off the required length, leaving the remainder loose and liable to be tangled up, thus becoming useless. Such a calamity cannot happen with my method of storing a fish line.

In depositing the fish line in the several envelopes A to F, six being shown, the entire line is first coiled up into six bundles, all connected with each other. One bundle is thereupon dropped into the top opening 16 of each envelope, with the innermost coil portion slipped down along the slit 15 into the center hole 14, and the outermost coil portion emerging from the top opening under the flap 11.

It is to be understood that the invention as herein disclosed may be varied from the details described and shown without departure from the spirit of the subjoined claims.

I claim:

1. As an article of manufacture a fishing line package comprising a plurality of separate, spaced coils formed from a single continuous line, an envelope for each coil, a coil in each envelope, each envelope having an opening in the center of one side wall and a flap covered edge opening, the flap being connected with the opposite side wall, the line of one coil leading from the outside thereof to the center of another coil, said coils in the envelopes having the portion of the line leading from the outside passing out through the edge opening beneath the flap and having the portion of the line leading from the center thereof passing through the center opening, and that side wall of the envelope having the center opening, having a slit leading from the center opening to and through the edge of the wall bordering the edge opening, said slit facilitating the placement in the center opening of that portion of the line leading from the center of the coil after the coil is placed in the envelope.

2. An article of manufacture as set forth in claim 1, wherein the said slit is tangent to the central opening and the coil being so disposed in the envelope that when it is unwound from the center through the side wall opening the direction of unwinding will be away from the end of the slit where it merges with the edge of the central opening.

R. B. WORDEN.

REFERENCES CITED

The following references are of record in the file of this patent:

UNITED STATES PATENTS

| Number | Name | Date |
|---|---|---|
| 1,063,646 | Bournonville | June 3, 1913 |
| 1,739,549 | Harris | Dec. 17, 1929 |
| 1,878,306 | Whittier | Sept. 20, 1932 |
| 2,084,134 | Dunkerke | June 15, 1937 |